United States Patent
Zhang

(10) Patent No.: US 10,172,067 B2
(45) Date of Patent: Jan. 1, 2019

(54) BYPASSING EXTERNAL PACKET DATA NETWORKS IN MOBILE-TO-MOBILE COMMUNICATION

(71) Applicant: Alcatel-Lucent USA Inc., Murray Hill, NJ (US)

(72) Inventor: Yangling Zhang, Batavia, IL (US)

(73) Assignee: Nokia of America Corporation, Murray Hill, NJ (US)

( * ) Notice: Subject to any disclaimer, the term of this patent is extended or adjusted under 35 U.S.C. 154(b) by 39 days.

(21) Appl. No.: 15/258,463

(22) Filed: Sep. 7, 2016

(65) Prior Publication Data
US 2018/0070283 A1 Mar. 8, 2018

(51) Int. Cl.
| | |
|---|---|
| *H04W 40/02* | (2009.01) |
| *H04W 8/02* | (2009.01) |
| *H04W 68/00* | (2009.01) |
| *H04W 76/14* | (2018.01) |
| *H04W 76/11* | (2018.01) |
| *H04W 28/02* | (2009.01) |
| *H04W 92/24* | (2009.01) |
| *H04W 76/12* | (2018.01) |
| *H04W 88/16* | (2009.01) |

(52) U.S. Cl.
CPC .............. *H04W 40/02* (2013.01); *H04W 8/02* (2013.01); *H04W 28/0247* (2013.01); *H04W 68/005* (2013.01); *H04W 76/11* (2018.02); *H04W 76/12* (2018.02); *H04W 76/14* (2018.02); *H04W 92/24* (2013.01); *H04W 88/16* (2013.01)

(58) Field of Classification Search
CPC ... H04W 40/02; H04W 8/02; H04W 28/0247; H04W 68/005; H04W 76/021; H04W 76/023
See application file for complete search history.

(56) References Cited

U.S. PATENT DOCUMENTS

| | | | |
|---|---|---|---|
| 8,831,014 B2* | 9/2014 | Koodli | H04L 12/14 370/401 |
| 2001/0032232 A1* | 10/2001 | Zombek | H04L 1/1635 709/201 |
| 2008/0235733 A1* | 9/2008 | Heie | H04N 7/163 725/46 |
| 2010/0278345 A1* | 11/2010 | Alsina | H04L 63/0492 380/283 |

(Continued)

OTHER PUBLICATIONS

International Search Report and Written Opinion for PCT/US2017/050420, dated Dec. 18, 2017, 11 pages.

*Primary Examiner* — Ronald B Abelson

(57) ABSTRACT

A first gateway receives, from a source user equipment, an uplink packet addressed to a target user equipment and identifies a pairing between the source user equipment and the target user equipment. The first gateway routes the received uplink packet to the target user equipment on a communication path that bypasses an Internet. A first mobility management entity (MME) receives, from a source user equipment, a first request to pair the source user equipment with a target user equipment and transmits a second request to a gateway to pair the source user equipment with the target user equipment. The first MME transmits messages to the source user equipment and the target user equipment including an identifier of the pairing received from the gateway in response to the second request.

18 Claims, 7 Drawing Sheets

(56) References Cited

U.S. PATENT DOCUMENTS

| | | |
|---|---|---|
| 2012/0121771 A1 | 2/2012 | Jones |
| 2014/0086210 A1* | 3/2014 | Wu .................. H04L 12/66 370/331 |
| 2014/0362772 A1 | 12/2014 | Li et al. |
| 2015/0146520 A1 | 5/2015 | Zakrzewski |

* cited by examiner

BYPASSING EXTERNAL PACKET DATA NETWORKS IN MOBILE-TO-MOBILE COMMUNICATION

BACKGROUND

Field of the Disclosure

The present disclosure relates generally to wireless communication systems and, more particularly, communication between user equipment in a wireless communication system.

Description of the Related Art

Wireless communication systems include one or more base stations (which may also be referred to as eNodeBs in LTE) that provide wireless connectivity to user equipment over an air interface. The base stations are connected to a core network such as an evolved packet core (EPC) network that conveys packets according to the Internet protocol (IP). The core network is connected to an external packet data network such as the Internet for conveying packets between user equipment in different locations. For example, user equipment can attach to a core network and register with a server that is implemented in the Internet and configured to relay data packets that are received from the core network. The user equipment can then establish voice or data connections with other user equipment via the Internet. Registering with an Internet server slows down the process of establishing the connection and may incur additional costs to the user or application developers. Some user equipment are configured for device-to-device (D2D) communication that allow the user equipment to communicate directly with other user equipment over the interface using the radios implemented by the different user equipment. The communication path between user equipment engaged in D2D communication bypasses the base stations, the core network, and the Internet and is therefore particularly useful in emergency situations when these entities are not available. However, not all user equipment are configured for D2D communication and D2D communication is impractical or impossible for user equipment that are separated by distances on the order of a kilometer or more.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

A gateway (such as a packet data node (PDN) gateway, PGW) can efficiently connect source and target user equipment along a communication path that bypasses an external packet data network such as the Internet by receiving uplink packets addressed to the target user equipment, identifying a pairing between the source user equipment and the target user equipment, and converting the received uplink packets into downlink packets for transmission to the target user equipment. The source user equipment initiates a pairing procedure to establish the pairing by transmitting a request including an identifier of the target user equipment, such as an MSISDN that uniquely identifies a subscriber identity module (SIM) card in the target user equipment. The request is received by a mobility management entity (MME) that is aware of the activity state of the target user equipment. If the target user equipment is in an idle state, the MME pages the target user equipment using a paging message that indicates a pairing request. The MME selects a gateway that serves the target user equipment and transmits information identifying the source and target user equipment to the gateway to initiate the pairing procedure. In some variations, the source and target user equipment are served by different MMES, SGWs, or PGWs. In that case, inter-MME or inter-PGW communication links can be used to pair the source and target user equipment.

Once the source and target user equipment have been paired at the gateway, the gateway can modify the format of uplink packets received from the source user equipment and addressed to the target user equipment to create downlink packets for transmission from the gateway to the target user equipment. Once the pairing has been established, the gateway can also receive uplink packets from the target user equipment and convert them to downlink packets addressed to the source user equipment so that communication can proceed in both directions. Inter-PGW communication can be used to route data packets between the paired source and target user equipment if the source and target user equipment are served by different MMES, SGWs, or PGWs.

Figure 1:
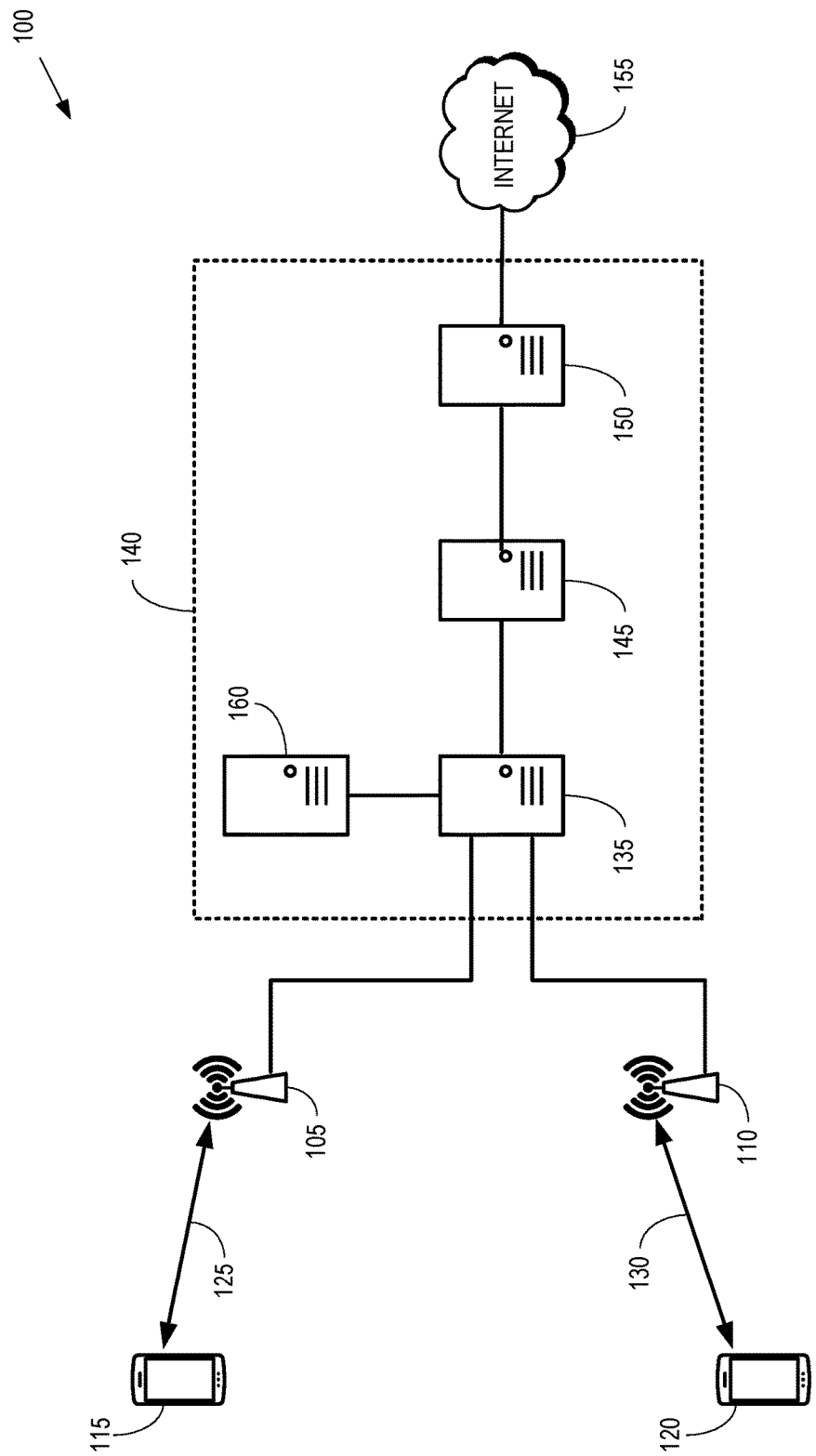
FIG. 1 is a block diagram of a wireless communication system according to some embodiments.

FIG. 1 is a block diagram of a wireless communication system 100 according to some embodiments. The wireless communication system 100 includes base stations 105, 110 for providing wireless connectivity to user equipment 115, 120 over air interfaces 125, 130. Some embodiments of the base stations 105, 110 and the user equipment 115, 120 operate according to Long Term Evolution (LTE) standards defined by the Third Generation Partnership Project (3GPP). However, other embodiments of the base stations 105, 110 or user equipment 115, 120 can operate according to other standards and/or protocols for supporting wireless connectivity. The base stations 105, 110 can be referred to using other terms such as eNodeBs, base station routers, home base station routers, access points, access networks, and the like. The user equipment 115, 120 can be referred to using other terms such as mobile units, mobile devices, subscriber stations, wireless transmission/reception units, wireless communication devices, smart phones, and the like.

The base stations 105, 110 are connected to a mobility management entity (MME) 135 within a core network 140 such as an Evolved Packet Core (EPC). The MME 135 is responsible for paging the user equipment 115, 120 in the idle mode and supports activating and deactivating radio bearers used to convey information over the air interfaces 125, 130. The MME 135 is also responsible for authenticating the user equipment 115, 120 and terminating non-access stratum (NAS) signaling between the core network and the user equipment 115, 120. The NAS signaling is used to convey control information between the user equipment 115, 120 and the MME 135. The NAS protocol supports mobility of the user equipment 115, 120 and session management procedures that are used to establish and maintain Internet Protocol (IP) connectivity between the user equipment 115, 120 and other gateways in the core network. The NAS protocol is also used to support secure connections using integrity protection and ciphering of the NAS signaling messages.

The MME 135 is able to select a serving gateway 145 for the user equipment 115, 120. The serving gateway 145 routes and forwards user data packets and is a mobility anchor in a user plane during handovers between base stations such as the base stations 105, 110. When the user equipment 115, 120 are in the idle mode, the serving gateway 145 terminates the downlink data path and triggers paging of the idle user equipment 115, 120 when data arrives for transmission to the idle user equipment 115, 120.

The user equipment 115, 120 are connected to a packet data node (PDN) gateway 150 that provides connectivity between the core network and external packet data networks such as an Internet 155. The PDN gateway 150 is therefore the point of exit of packet traffic as it leaves the core network and enters the external packet data network, and the point of entry of packet traffic as it enters the core network and leaves the external packet data network. Although a single PDN gateway 150 is depicted in FIG. 1, the user equipment 115, 120 are able to maintain simultaneous or concurrent connectivity with more than one PDN gateway for accessing multiple external packet data networks.

A home subscriber server (HSS) 160 is connected to the MME 135. The HSS is a database that includes user-related and subscription-related information. Some embodiments of the HSS 160 include information identifying the PDN gateways that are serving the user equipment 115, 120. For example, the identities of the PDN gateways (including the PDN gateway 150) that serve the user equipment 115, 120 can be stored in a database that is indexed by globally unique identifiers of the user equipment 115, 120, such as MSISDN identifiers of the user equipment 115, 120. As used herein, the term "globally unique identifier" is understood to refer to an identifying sequence of characters, numbers, or other symbols that uniquely identifies the corresponding device throughout the world. The HSS 160 is also responsible for mobility management, call and session establishment support, user authentication, and access authorization for the user equipment 115, 120.

The MME 135 is configured to establish a pairing between the user equipment 115, 120 that can be used to route packets between the user equipment 115, 120 via the PDN gateway 150 without transmitting the packets to the external packet data network 155. For example, the MME 135 can receive a first request to pair a source user equipment 115 with a target user equipment 120. The first request can be an NAS signaling message that includes information identifying the target user equipment 120, such as a globally unique identifier of the target user equipment 120. The MME 135 transmits a second request to the PDN gateway 150 (via the serving gateway 145) to pair the source user equipment 115 with the target user equipment 120. The PDN gateway 150 can transmit a message confirming that the pairing has been established and, in response to receiving the message, the MME 135 transmits messages to the user equipment 115, 120 including a pairing identifier provided by the PDN gateway 150. For example, the MME 135 can transmit NAS signaling messages to the user equipment 115, 120. The pairing identifier is used as an index into a table of pairings stored by the PDN gateway 150.

Once the pairing between the user equipment 115, 120 has been established, the PDN gateway 150 can route packets between the user equipment 115, 120 along a communication path that bypasses the external packet data network 155. For example, the PDN gateway 150 can receive an uplink packet from the source user equipment 115 that is addressed to the target user equipment 120. The PDN gateway 150 uses information in the uplink packets (such as a pairing identifier) to identify a pairing between the source user equipment 115 and the target user equipment 120. The PDN gateway 150 is then able to route the received uplink packet to the target user equipment 120 on a communication path that bypasses the external packet data network 155. For example, the PDN gateway 150 can convert the received uplink packet into a downlink packet that is transmitted to the target user equipment 120. Uplink packets received from the user equipment 120 can also be routed to the user equipment 115 on a communication path that bypasses the external packet data network 155.

As used herein, the term "uplink packet" refers to a packet that has been received from the user equipment 115, 120 has not yet been transmitted to an external packet data network by a corresponding gateway in a core network. Thus, a packet is referred to as an uplink packet as it is conveyed along a communication path from the user equipment 115 to the base station 105, the MME 135, the SGW 145, and the PGW 150. As used herein, the term "downlink packet" refers to a packet that has been received from an external packet data network and is conveyed to a user equipment by a corresponding core network. Thus, a packet is referred to as a downlink packet as it is conveyed along a communication path in the core network 140 from the PGW 150 to the SGW 145, the MME 135, the base stations 105, 110, and over the air interfaces 125, 130 to the user equipment 115, 120.

Figure 2:
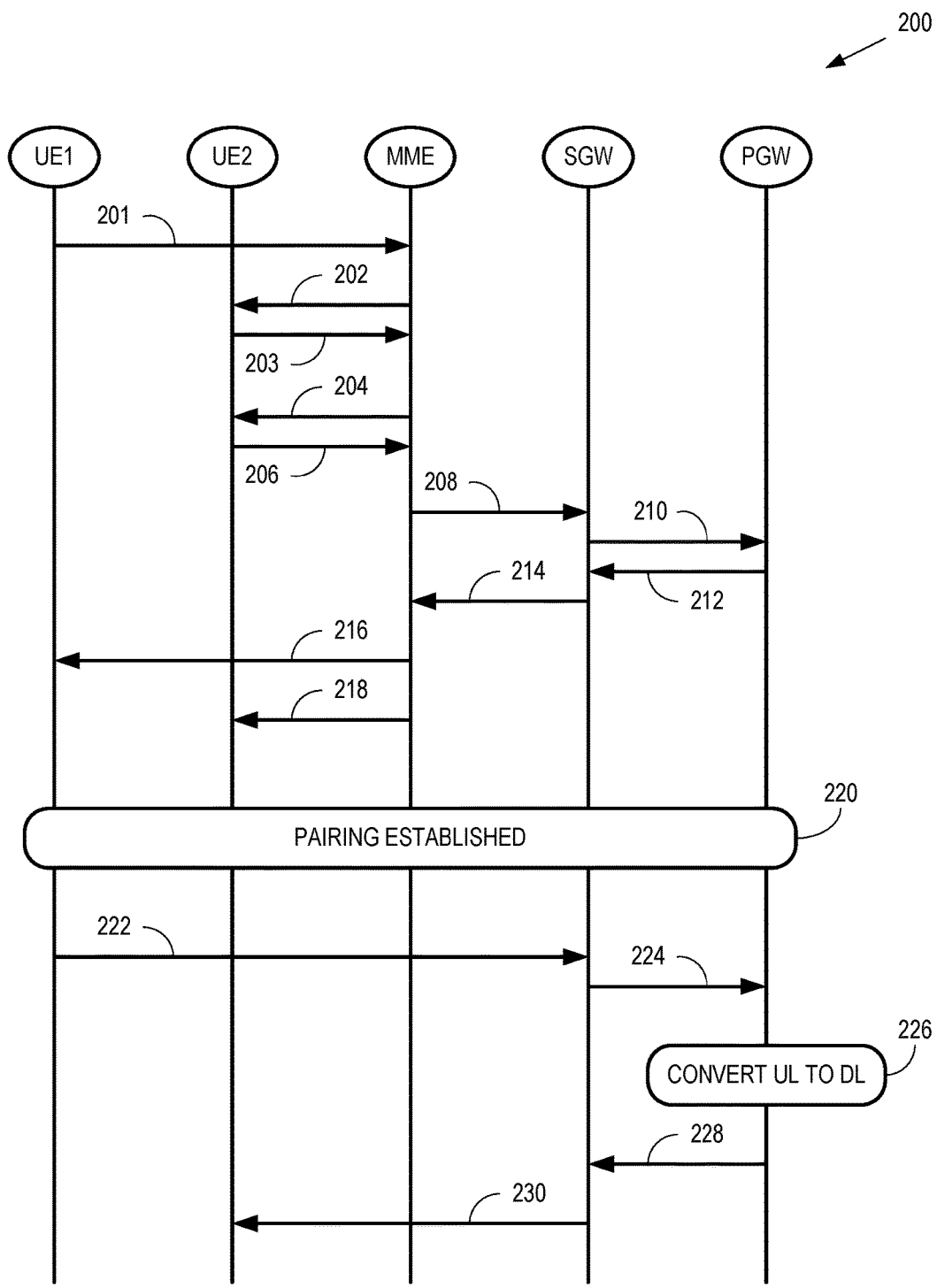
FIG. 2 is a diagram of a message flow that is used to establish packet routing between paired user equipment at a packet data node (PDN) gateway (PGW) according to some embodiments.

FIG. 2 is a diagram of a message flow 200 that is used to establish packet routing between paired user equipment at a PDN gateway according to some embodiments. The message flow 200 illustrates messages transmitted between, and actions performed by, first and second user equipment (UE1, UE2), an MME, an SGW, and a PGW. The message flow 200 can therefore be implemented in some embodiments of the wireless communication system 100 shown in FIG. 1.

The first user equipment initiates the message flow 200 by transmitting a request 201 to the MME to be paired with the second user equipment. Some embodiments of the request 201 are transmitted as NAS signaling messages including an indicator of the pairing request and a globally unique identifier of the second user equipment such as an MSISDN. The NAS signaling message can also include a globally unique identifier of the first user equipment. In the illustrated embodiment, the second user equipment is in an idle mode and the MME is able to determine that the second user equipment is in the idle mode using information stored in the MME. The MME responds to the request 201 by transmitting a paging message 202 to the second user equipment. Some embodiments of the paging message 202 are transmitted as NAS signaling including an indicator that the paging message 202 is associated with a pairing request. The second user equipment transitions from the idle mode to the active mode in response to receiving the paging message 202 and transmits a message 203 to the MME to indicate that it is awake and available to be paired with the first user equipment. Some embodiments of the message 203 are transmitted as NAS signaling including a service request for pairing with the first user equipment. In cases where the second user equipment is already in the active mode, the MME and the second user equipment can bypass exchange of the messages 202, 203. The MME then transmits a message 204 (such as an NAS message) to request pairing between UE1 and UE2. The UE2 can respond with a message 206 (which can also be an NAS message) to acknowledge that it accepts the request to pair with UE1.

The MME transmits a message 208 to the SGW to request creation or modification of a pairing between the first and second user equipment. Some embodiments of the MME select the PGW from a list of packet data network connections (and corresponding PGWs) for the first user equipment. In response to receiving the message 208, the SGW transmits a message 210 to the PGW to request creation or modification of the pairing between the first and second user equipment. The PGW creates the pairing in response to receiving the message 210, e.g., by storing the globally unique identifiers of the first and second user equipment in a table that is indexed by a pairing identifier. The PGW then transmits a message 212 to the SGW to acknowledge creation or modification of the requested pairing. In response to receiving the message 212, the SGW transmits a message 214 to the MME to acknowledge creation or modification of the requested pairing. Some embodiments of the messages 208, 210, 212, 214 are General Packet Radio Service (GPRS) tunneling protocol (GTP) signals such as GTP pairing modification request/response messages. The messages 208, 210, 212, 214 can include information such as the globally unique identifiers of the first and second user equipment. The SGW and the PGW can use information in the GTP messages 208, 210, 212, 214 to allocate a pairing identifier that identifies the pairing between the first user equipment and the second user equipment at the PGW. Some embodiments of the SGW and the PGW can use tunnel endpoint identifiers (TEIDs) of the first and second user equipment to uniquely identify the first and second user equipment and their associated bearers. This information can then be used to route uplink packets between the paired first and second user equipment, as discussed herein.

In response to receiving the message 214, the MME transmits a message 216 to inform the first user equipment that the requested pairing has been established at the PGW. The MME also transmits a message 218 to inform the second user equipment that the requested pairing has been established at the PGW. Some embodiments of the messages 216, 218 are NAS signaling messages that include pairing information such as the globally unique identifiers of the first user equipment or the second user equipment. The pairing between the first and second user equipment is therefore established at block 220.

Once the pairing has been established, the PGW can route packets between the first and second user equipment based on the pairing without transmitting the packets to an external packet data network, such as the Internet. For example, the first user equipment transmits an uplink data packet 222 to the SGW. The uplink data packet 222 can be transmitted in a GTP-U packet that includes a GTP header that includes the TEID of the first user equipment and, in some embodiments, the pairing identifier that identifies the pairing between the first user equipment and the second user equipment at the PGW. The SGW forwards (at arrow 224) the uplink data packet to the PGW, which uses TEID (or the pairing identifier) to identify the pairing between the first user comment and the second user equipment. In response to identifying the pairing, the PGW bypasses transmitting the uplink data packet to an external packet data network. Instead, the PGW converts (at block 226) the uplink packet into a downlink data packet addressed to the second user equipment. For example, the PGW can modify the format of the GTP header of the uplink data packet to create the downlink data packet. The PGW then transmits the downlink data packet 228 to the SGW, which forwards (at arrow 230) the downlink data packet to the second user equipment. The PGW can also receive uplink data packets from the second user equipment and route them to the first user equipment on the basis of the TEID of the second user equipment (or the pairing identifier) included in the header of the uplink data packet.

Figure 3:
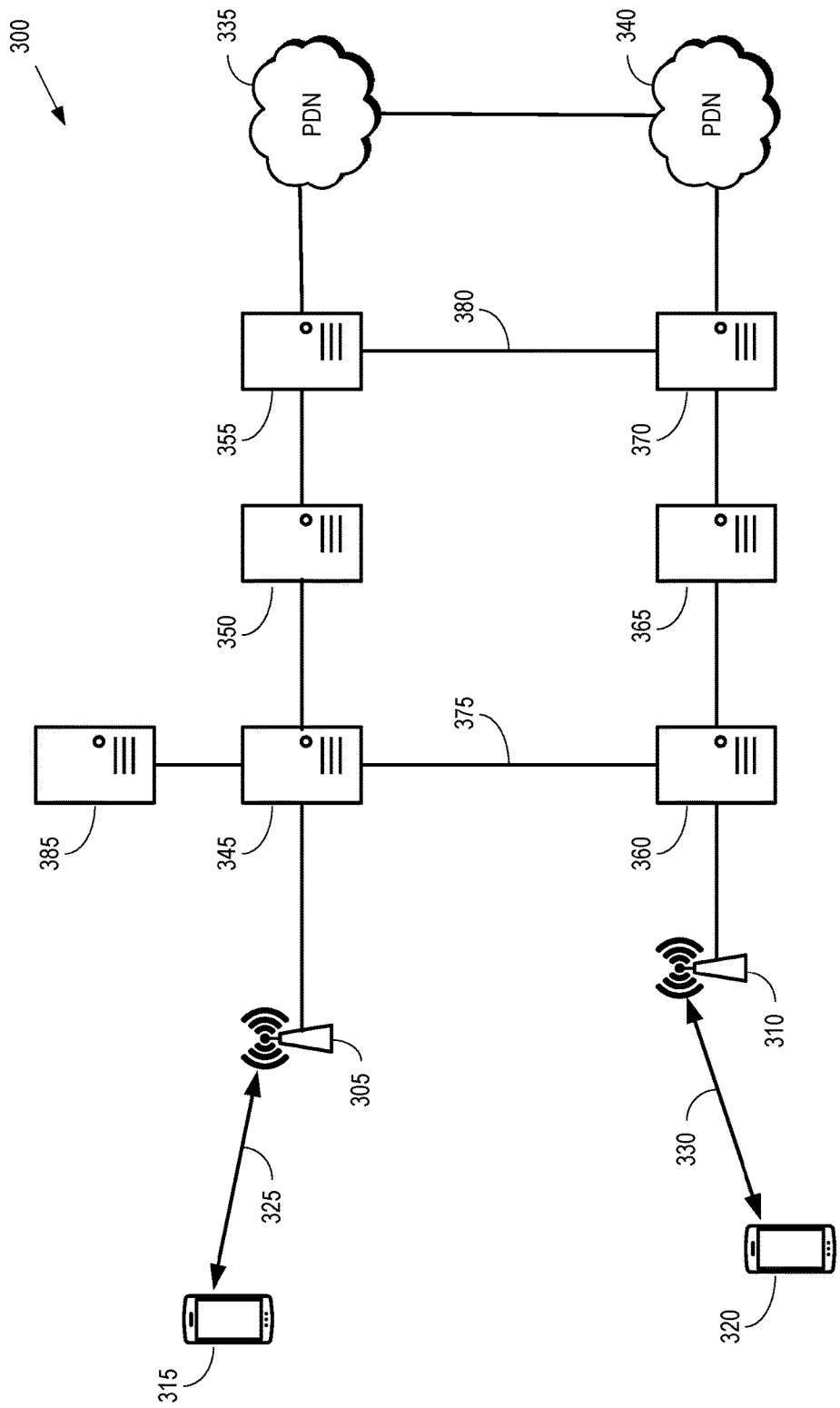
FIG. 3 is a block diagram of a wireless communication system that supports inter-mobility management entity (MME) and inter-PGW communication according to some embodiments.

FIG. 3 is a block diagram of a wireless communication system 300 that supports inter-MME and inter-PGW communication according to some embodiments. The wireless communication system 300 includes base stations 305, 310 for providing wireless connectivity to user equipment 315, 320 over air interfaces 325, 330. Some embodiments of the base stations 305, 310 and the user equipment 315, 320 operate according to Long Term Evolution (LTE) standards defined by the Third Generation Partnership Project (3GPP). However, other embodiments of the base stations 305, 310 □□ nt 315, 320 can operate according to other standards or protocols for supporting wireless connectivity.

The wireless communication system 300 differs from the wireless communication system 100 shown in FIG. 1 because the base stations 305, 310 and the corresponding user equipment 315, 320 are connected to different external packet data networks 335, 340, which can be interconnected to facilitate communication between the base stations 305, 310 or the user equipment 315, 320. The base station 305 is connected to the external packet data network 335 by an MME 345, an SGW 350, and a PGW 355. The base station 310 is connected to the external packet data network 340 by an MME 360, an SGW 365, and a PGW 370. An interface 375 is used for inter-MME communication between the MME 345 and the MME 360. An interface 380 is used for inter-PGW communication between the PGW 355 and the PGW 365. The MME 345 is also connected to an HSS 385. Some embodiments of the MME 360 can be connected to an HSS (not shown in FIG. 1).

The MMEs 345, 360 are configured to establish a pairing between the user equipment 315, 320 that can be used to route packets between the user equipment 315, 320 via the PDN gateways 355, 370 without transmitting the packets to the external packet data networks 335, 340. For example, the MME 345 can receive a first request to pair a source user equipment 315 with a target user equipment 320. The first request can be an NAS signaling message that includes information identifying the target user equipment 320, such as a globally unique identifier of the target user equipment 320. The MME 345 can transmit a request to the HSS 385 that includes the globally unique identifier so that the HSS 385 can locate and provide the identity of the MME 360 or the PDN gateway 370 associated with the target user equipment 320. The MME 345 can communicate over the interface 375 with the MME 360 to transmit a pairing request (or a paging message) to the target user 320. The MME 345 can also transmit a second request to the PDN gateway 355 (via the serving gateway 350) to pair the source user equipment 315 with the target user equipment 320. The PDN gateway 355 can transmit a message confirming that the pairing has been established and, in response to receiving the message, the MME 345 transmits messages to the user equipment 315, 320 including a pairing identifier provided by the PDN gateway 355. The pairing identifier or one of the TEIDs of the source user equipment 315 or the target user equipment 320 can be used as an index for a table of pairings stored by the PDN gateway 355.

Once the pairing between the user equipment 315, 320 has been established, the PDN gateway 355 can route packets between the user equipment 315, 320 along a communication path that bypasses the external packet data networks 335, 340. For example, the PDN gateway 355 can receive an uplink packet from the source user equipment 315 that is addressed to the target user equipment 320. The PDN gateway 355 uses information in the uplink packets to identify a pairing between the source user equipment 315 and the target user equipment 320. The PDN gateway 355 is then able to route the received uplink packet to the target user equipment 320 on a communication path that bypasses the external packet data networks 335, 340. For example, the PDN gateway 355 can convert the uplink packets to downlink packets and route the downlink packets over the interface 380 to the PDN gateway 370, which routes the downlink packets to the user equipment 320 via the SGW 365, the MME 360, and the base station 310.

Figure 4A:
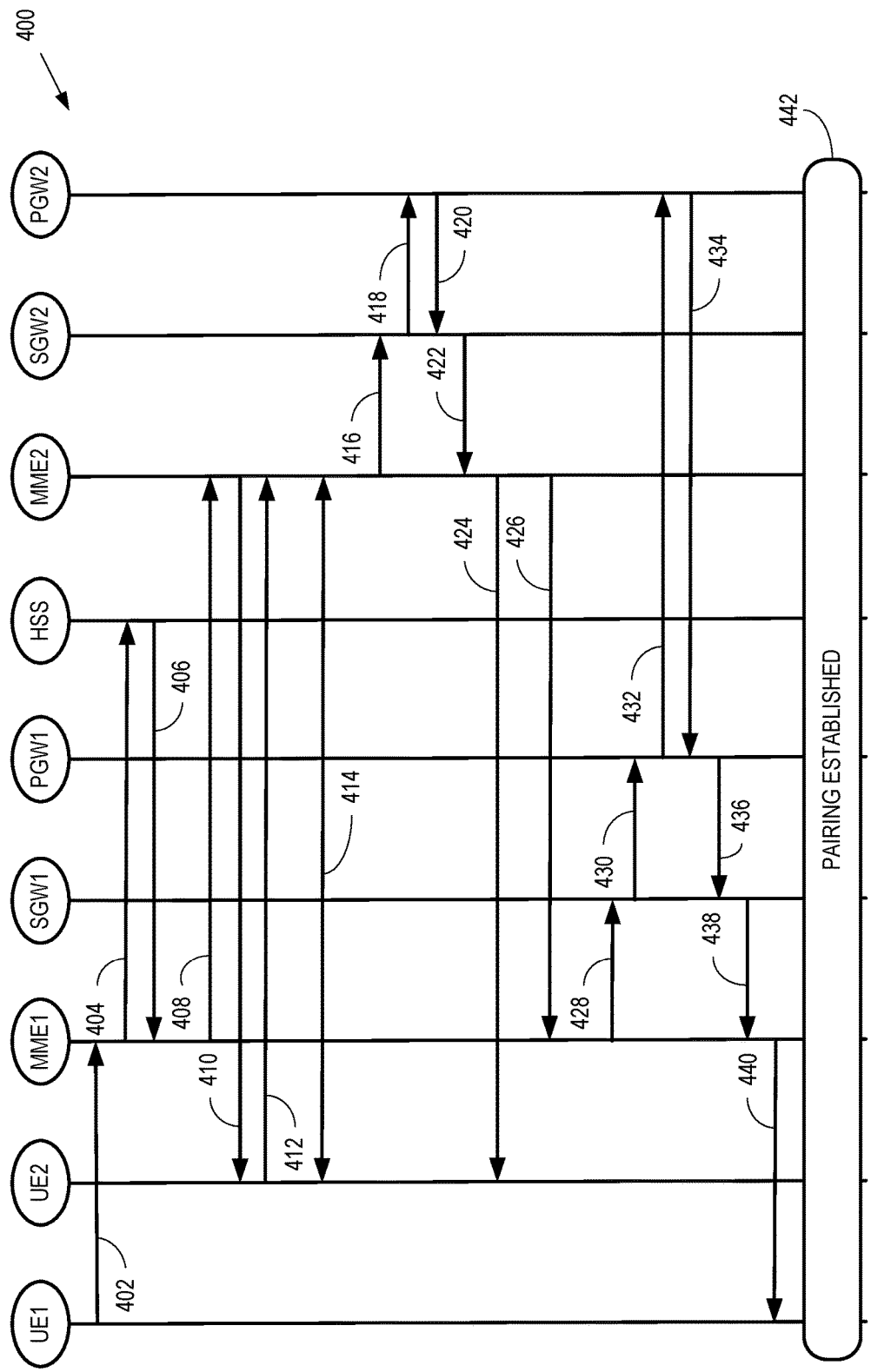
FIGS. 4A and 4B illustrate a diagram of a message flow that is used to establish packet routing between paired user equipment at a PDN gateway using inter-MME and inter-PGW communication according to some embodiments.
Figure 4B:
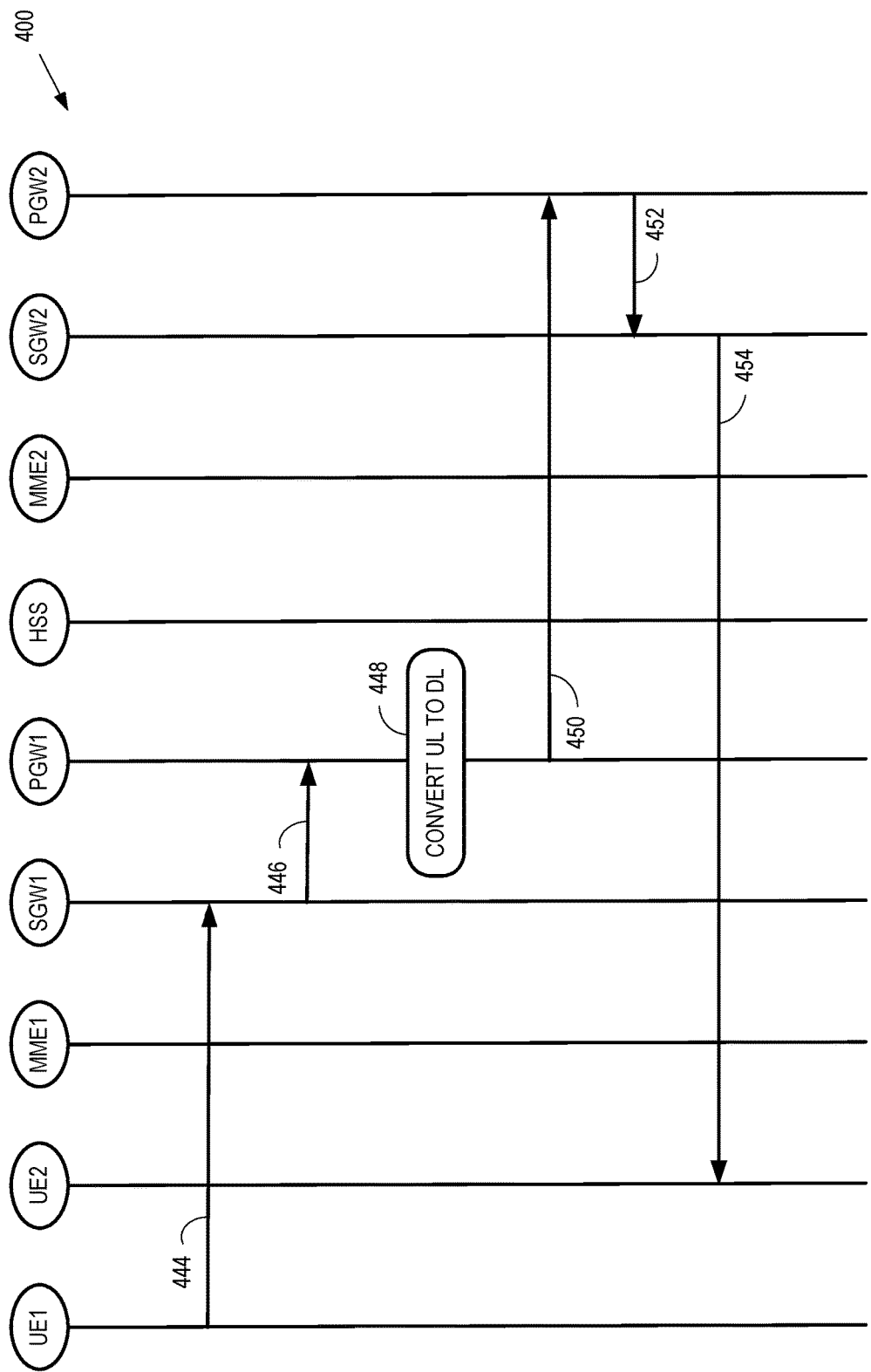

FIGS. 4A and 4B illustrate a diagram of a message flow 400 that is used to establish packet routing between paired user equipment at a PDN gateway using inter-MME and inter-PGW communication according to some embodiments. The message flow 400 illustrates messages transmitted between, and actions performed by, first and second user equipment (UE1, UE2) that are served by the respective MME1 and MME2, SGW1 and SGW2, and PGW1 and PGW2. The message flow 400 can therefore be implemented in some embodiments of the wireless communication system 300 shown in FIG. 3.

The first user equipment initiates the message flow 400 by transmitting a request 402 to the MME1 to be paired with the second user equipment. Some embodiments of the request 402 are transmitted as NAS signaling messages including an indicator of the pairing request and a globally unique identifier of the second user equipment such as an MSISDN. The NAS signaling message can also include a globally unique identifier of the first user equipment. In response to receiving the request 402, the MME1 transmits a mobile node identification request 404 to the HSS. Some embodiments of the request 404 are transmitted as Diameter signaling messages that include the globally unique identifier of the second user equipment. The HSS uses the globally unique identifier to retrieve information identifying MME2 or PGW2 associated with the second user equipment. The information retrieved by the HSS is returned to MME1 in Diameter signaling message 406.

The MME1 transmits a message 408 to MME2 to request pairing with the second user equipment. In the illustrated embodiment, the MME2 is able to determine that the second user equipment is in the idle mode using information stored in the MME2. The MME2 sends a paging message 410 to the second user equipment. Some embodiments of the paging message 410 are includes an indicator of a pairing request. The second user equipment transitions from the idle mode to the active mode in response to receiving the paging message 410 and transmits a message 412 to the MME2 to indicate that it is awake and available to be paired with the first user equipment. Some embodiments of the message 412 are transmitted as NAS signaling including a service request for pairing with the first user equipment. In cases where the second user equipment is already in the active mode, the MME2 and the second user equipment can bypass exchange of the messages 410, 412. The MME2 and the UE2 can then exchange messages 414 (which can be NAS messages) to request and acknowledge acceptance of the pairing between UE1 and UE2.

In the illustrated embodiment, the second user equipment establishes a pairing with the PGW2 in response to exchanging the messages 414. The MME2 transmits a message 416 to the SGW2 to request creation or modification of a pairing between the first and second user equipment. Some embodiments of the MME2 select the PGW2 from a list of packet data network connections (and corresponding PGWs) for the second user equipment. In response to receiving the message 416, the SGW2 transmits a message 418 to the PGW2 to request creation or modification of the pairing between the first and second user equipment. The PGW2 creates the pairing in response to receiving the message 418, e.g., by storing the globally unique identifiers of the first and second user equipment in a table that is indexed by a pairing identifier. Both the PGW1 and the PGW2 use the same pairing identifier to identify the pairing between the first and second user equipment. The PGW2 transmits the message 420 to the SGW2 to acknowledge creation or modification of the requested pairing. In response to receiving the message 420, the SGW2 transmits a message 422 to the MME2 to acknowledge creation or modification of the requested pairing. Some embodiments of the messages 412, 414, 416, 418, 420, 422 are NAS signals such as NAS pairing modification request/response messages. The messages 412, 414, 416, 418, 420, 422 can include information such as the globally unique identifiers of the first and second user equipment.

In response to receiving the message 422, the MME2 transmits a message 424 to inform the second user equipment that the requested pairing has been established at the PGW2. Some embodiments of the message 424 is an NAS signaling message that includes pairing information such as the globally unique identifiers of the first user equipment or the second user equipment. The MME2 also transmits a message 426 to inform the MME1 that the MME2 has completed its portion of the signaling to establish the pairing. Some embodiments of the message 426 include a TEID of the PGW2 that can be used by the PGW1 to transmit messages to the PGW2.

In response to receiving the message 426, the MME1 transmits a message 428 to the SGW1 to request creation or modification of the pairing between the first and second user equipment. Some embodiments of the MME1 select the PGW1 from a list of packet data network connections (and corresponding PGWs) for the first user equipment. In response to receiving the message 428, the SGW1 transmits a message 430 to the PGW1 to request creation or modification of the pairing between the first and second user equipment. The PGW1 creates the pairing in response to receiving the message 430, e.g., by storing the globally unique identifiers of the first and second user equipment in a table that is indexed by a pairing identifier. Both the PGW1 and the PGW2 use the same pairing identifier to identify the pairing between the first and second user equipment. The PGW1 transmits a message 432 to inform the PGW2 that the pairing has been created by the PGW1. The message 432 is addressed using the PGW2 TEID received a message 434. The PGW2 acknowledges receipt of the message 432 by transmitting a message 434 to the PGW1, which transmits a message 436 to the SGW1 to acknowledge creation or modification of the requested pairing. In response to receiving the message 436, the SGW1 transmits a message 438 to inform the first user equipment that the requested pairing has been established at the PGW1. The messages 428, 430, 432, 434, 436, 438, 440 can include information such as the globally unique identifiers of the first and second user equipment.

The pairing between the first and second user equipment is established at block 442. Establishment of the pairing between the first and second user equipment (at 442) can include exchanging messages between the MME1 and the MME2 to confirm that the pairing has been established for routing packets between the first and second user equipment. Establishment of the pairing between the first and second user equipment (at 442) can also include exchanging messages between the PGW1 and the PGW2 to confirm that the pairing has been established for routing packets between the first and second user equipment.

Once the pairing has been established, the PGW1 and PGW2 can route packets between the first and second user equipment based on the pairing without transmitting the packets to the corresponding external packet data networks. For example, the first user equipment transmits an uplink data packet 444 to the SGW1. The SGW1 forwards (at arrow 446) the uplink data packet to the PGW1, which uses the GTP-U TEID value to identify the pairing between the first user equipment and the second user equipment. In response to identifying the pairing, the PGW bypasses transmitting the uplink data packet to an external packet data network. Instead, the PGW converts (at block 448) the uplink packet into a downlink data packet addressed to the second user equipment. For example, the PGW can modify the format of the header of the uplink data packet to create the downlink data packet. The PGW then transmits the downlink data packet 450 to the PGW2. Based on the identified pairing, the PGW2 transmits (at arrow 452) the downlink data packets to the SGW2, which forwards (at 454) the downlink data packet to the second user equipment. The PGW2 can also receive uplink data packets from the second user equipment and route them to the first user equipment (via the PGW1) on the basis of a pairing identifier included in the header of the uplink data packet.

Figure 5:
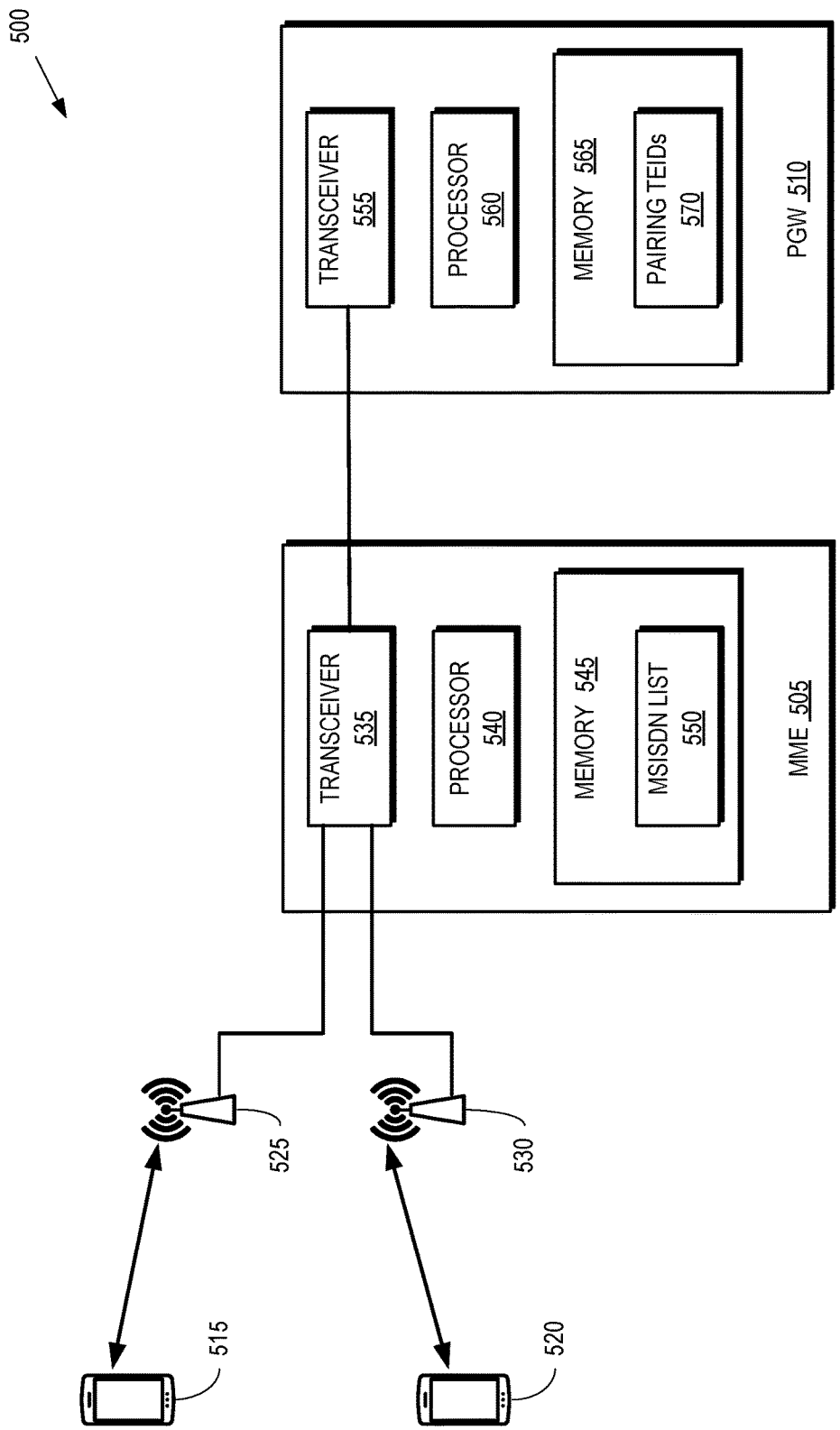
FIG. 5 is a block diagram of a wireless communication system including an MME and a PGW that are able to route packets between user equipment along a communication path that bypasses one or more external packet data networks according to some embodiments.

FIG. 5 is a block diagram of a wireless communication system 500 including an MME 505 and a PGW 510 that are able to route packets between user equipment 515, 520 along a communication path that bypasses one or more external packet data networks according to some embodiments. The wireless communication system 500 also includes base stations 525, 530 that are used to support wireless communication with the user equipment 515, 520. In the illustrated embodiment, the base stations 525, 530 are both connected to the MME 505. However, in other embodiments, the base station 525, 530 can be connected to different MME that communicate with either the same or different PGW to access different external packet data networks, as discussed herein.

The MME 505 includes a transceiver 535 for transmitting and receiving signals such as signals exchanged with the base stations 525, 530 or the PGW 510. The transceiver 535 may be implemented as a single integrated circuit (e.g., using a single ASIC or FPGA) or as a system-on-a-chip (SOC) that includes different modules for implementing the functionality of the transceiver 535. The MME 505 also includes a processor 540 and a memory 545. The processor 540 is used to execute instructions stored in the memory 545 and to store information in the memory 545 such as the results of the executed instructions. Some embodiments of the memory 545 include a list 550 of the globally unique identifiers (such as MSISDNs) of user equipment that are served by the MME 505 such as the user equipment 515, 520. The MME 505 is therefore able to perform some embodiments of the method 200 shown in FIG. 2 and the method 400 shown in FIG. 4.

The PGW 510 includes a transceiver 555 for transmitting and receiving signals such as signals exchanged with the MME 505 or an external packet data network (not shown in FIG. 5). The transceiver 555 may be implemented as a single integrated circuit (e.g., using a single ASIC or FPGA) or as a system-on-a-chip (SOC) that includes different modules for implementing the functionality of the transceiver 555. The PGW 510 also includes a processor 560 and a memory 565. The processor 560 is used to execute instructions stored in the memory 565 and to store information in the memory 665 such as the results of the executed instructions. Some embodiments of the memory 665 include a data structure 570 that includes pairings of user equipment (such as the pairing of the user equipment 515, 520) that can be indexed by a corresponding pairing identifiers (TEIDs). For example, the pairings can be indicated by the globally unique identifiers of the user equipment. The PGW 510 is therefore able to perform some embodiments of the method 200 shown in FIG. 2 and the method 400 shown in FIG. 4.

Figure 6:
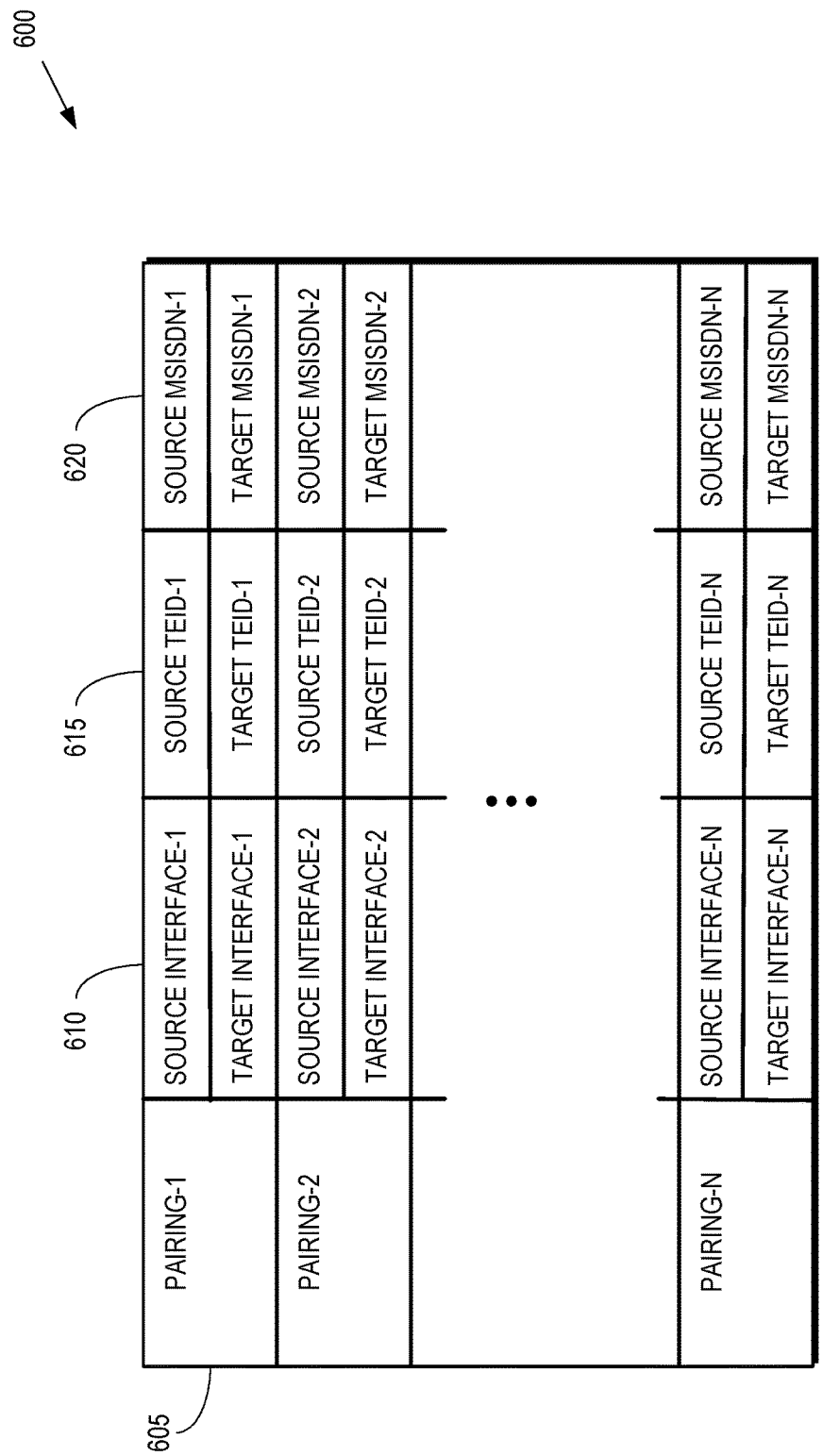
FIG. 6 is a diagram of a data structure that indicates pairings of user equipment for routing packets along a communication path that bypasses external packet data networks according to some embodiments.

FIG. 6 is a diagram of a data structure 600 that indicates pairings of user equipment for routing packets along a communication path that bypasses external packet data networks according to some embodiments. Some embodiments of the data structure 600 are used to implement the data structure 570 shown in FIG. 5. The data structure 600 includes fields 605, 610, 615, 620 (only one of each field indicated by a reference numeral in the interest of clarity) for storing a pairing identifier that identifies a particular pairing between different user equipment, interfaces such as GTP interfaces associated with each user equipment, identifiers of a TEID for each user equipment, and globally unique identifiers of the paired user equipment, respectively. For example, the field 605 includes a pairing identifier (PAIR-1) for a first pairing of source and target user equipment. The interfaces (SOURCE INTERFACE-1, TARGET INTERFACE-1) and TEID values for the paired user equipment are identified in the fields 610, 615, respectively. The source and target user equipment that are associated by the pairing are identified by their globally unique identifiers (SOURCE MSISDN-1, TARGET MSISDN-2) in the corresponding fields 620. The values in the fields 605, 610, 615, 620 can be created or modified according to embodiments of the method 200 shown in FIG. 2 or the method 400 shown in FIG. 4.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   receiving, at a first gateway of a core network from a source user equipment, an uplink packet addressed to a target user equipment;
   receiving, at the first gateway from a mobility management entity (MME), a request to pair the source user equipment and the target user equipment to form a pairing between the source user equipment and the target user equipment;
   storing information indicating the pairing at the first gateway in response to receiving the request; and
   routing, at the first gateway, the received uplink packet to the target user equipment on a communication path that bypasses an external packet data network that is connected to the first gateway, wherein receiving the request to pair the source user equipment and the target user equipment comprises receiving an uplink packet including globally unique identifiers of the source user equipment and the target user equipment, and wherein storing the information indicating the pairing comprises storing the globally unique identifiers and a corresponding pairing identifier.

2. The method of claim 1, wherein identifying the pairing comprises identifying the pairing based on a pairing identifier included in the uplink packet.

3. The method of claim 2, wherein routing the uplink packet to the target user equipment comprises accessing the globally unique identifiers based on the pairing identifier included in the uplink packet and routing the uplink packet to the target user equipment based on the globally unique identifier of the target user equipment.

4. The method of claim 1, wherein routing the uplink packet to the target user equipment comprises routing the uplink packet to the target user equipment via a second gateway in response to determining that the target user equipment is served by the second gateway.

5. A method, comprising:
   receiving, at a first mobility management entity (MME) from a source user equipment, a first request to pair the source user equipment with a target user equipment;
   transmitting from the MME to a gateway, a second request to pair the source user equipment with the target user equipment; and
   transmitting, from the MME to the source user equipment and the target user equipment, messages including an identifier of the pairing received from the gateway in response to the second request, wherein receiving the first request comprises receiving a first request including a globally unique identifier of the target user equipment.

6. The method of claim 5, further comprising:
   paging the target user equipment in response to determining that the target user equipment is idle based on the globally unique identifier.

7. The method of claim 5, wherein paging the target user equipment comprises transmitting a paging message including a request to pair the target user equipment with the source user equipment.

8. The method of claim 7, wherein transmitting the paging message comprises transmitting the paging message via a second MME in response to determining that the target user equipment is served by the second MME.

9. The method of claim 5 further comprising:
   selecting the gateway from a set of gateways associated with the source user equipment.

10. A first gateway to an external packet data comprising:
    a transceiver to receive, from a source user equipment, an uplink packet addressed to a target user equipment, wherein the transceiver is configured to receive, from a mobility management entity (MME), a request to pair the source user equipment and the target user equipment to form a pairing between the source user equipment and the target user equipment;
    a memory to store information indicating the pairing at the first gateway in response to receiving the request; and a processor to route the received uplink packet to the target user equipment on a communication path that bypasses the external packet data network, wherein the transceiver is to receive an uplink packet including globally unique identifiers of the source user equipment and the target user equipment, and wherein the memory is store the globally unique identifiers and a corresponding pairing identifier.

11. The first gateway of claim 10, wherein the processor is to identify the pairing based on a pairing identifier included in the uplink packet.

12. The first gateway of claim 11, wherein the processor is to access the globally unique identifiers from the memory based on the pairing identifier included in the uplink packet and route the uplink packet to the target user equipment based on the globally unique identifier of the target user equipment.

13. The first gateway of claim 10, wherein the processor is to route the uplink packet to the target user equipment via a second gateway in response to determining that the target user equipment is served by the second gateway.

14. A first mobility management entity (MME), comprising:
a transceiver to receive, from a source user equipment, a first request to pair the source user equipment with a target user equipment, transmit a second request to a gateway to pair the source user equipment with the target user equipment, and transmit messages to the source user equipment and the target user equipment including an identifier of the pairing received from the gateway in response to the second request, wherein the transceiver is to receive a first request including a globally unique identifier of the target user equipment.

15. The first MME of claim 14, wherein the transceiver is to page the target user equipment in response to determining that the target user equipment is idle based on the globally unique identifier.

16. The first MME of claim 14, wherein the transceiver is to transmit a paging message including a request to pair the target user equipment with the source user equipment.

17. The first MME of claim 16, wherein the transceiver is to transmit the pairing message via a second MME in response to determining that the target user equipment is served by the second MME.

18. The first MME of claim 14 further comprising:
a processor to select the gateway from a set of gateways associated with the source user equipment.

* * * * *